(12) United States Patent
Maryamchik et al.

(10) Patent No.: US 8,561,557 B2
(45) Date of Patent: Oct. 22, 2013

(54) PRIMARY OXIDANT FEED TO OXY-FIRED CIRCULATING FLUIDIZED BED (CFB)

(75) Inventors: Mikhail Maryamchik, Fairlawn, OH (US); Kiplin C. Alexander, Wadsworth, OH (US); Mark C. Godden, Mogadore, OH (US); David L. Kraft, Massillon, OH (US)

(73) Assignee: Babcock & Wilcox Power Generation Group, Inc., Barberton, OH (US)

( * ) Notice: Subject to any disclaimer, the term of this patent is extended or adjusted under 35 U.S.C. 154(b) by 1057 days.

(21) Appl. No.: 12/571,187

(22) Filed: Sep. 30, 2009

(65) Prior Publication Data

US 2011/0073022 A1    Mar. 31, 2011

(51) Int. Cl.
*F23C 10/20*        (2006.01)
(52) U.S. Cl.
USPC ........................................... 110/245; 422/143
(58) Field of Classification Search
CPC ....................................................... F23C 10/20
USPC ........................ 110/245, 297, 311, 312, 348;
261/114.2; 422/143, 144, 145; 122/4 D
See application file for complete search history.

(56) References Cited

U.S. PATENT DOCUMENTS

| | | | |
|---|---|---|---|
| 1,821,619 A * | 9/1931 | Day ............................ | 261/114.2 |
| 2,732,194 A * | 1/1956 | Jackson ...................... | 261/114.2 |
| 4,460,330 A * | 7/1984 | Asai et al. ...................... | 110/263 |
| 5,546,875 A * | 8/1996 | Selle et al. ..................... | 110/342 |
| 6,868,795 B2 * | 3/2005 | Maryamchik et al. ........ | 110/245 |
| 7,658,167 B2 * | 2/2010 | Morin et al. ................... | 110/245 |
| 8,007,274 B2 * | 8/2011 | Johnson et al. ................. | 431/40 |
| 2011/0000406 A1 * | 1/2011 | Eriksson et al. .............. | 110/205 |
| 2011/0232544 A1 * | 9/2011 | Eriksson ....................... | 110/205 |

* cited by examiner

*Primary Examiner* — Kenneth Rinehart
*Assistant Examiner* — David J Laux
(74) *Attorney, Agent, or Firm* — Eric Marich

(57) ABSTRACT

A system for feeding a primary oxidant to an oxy-fired circulating fluidized bed (CFB) boiler. The system includes a plurality of bubble cap assemblies each comprising a stem and a bubble cap with at least one exit hole, each bubble cap connected via a stem to at least one windbox, the windbox containing at least one manifold. A plurality of pipes are provided, each pipe located within a bubble cap assembly with an open end located either at, above or below the exit holes of the bubble caps and an opposite end connected to the manifold located inside each windbox. Recycle gas is piped into the windbox, to the stem, and exiting from the exit holes located in the bubble cap into the CFB. Oxygen is piped into the manifold, through the pipes and exiting through the exit holes located in the bubble cap. The pipe may further contain means placed at its open end, to prevent accidental inlet of hot particles into the pipe, such as a debris shield placed above and proximate to the open end of the pipe or by having the open end oriented in a downward direction. An insulating gap may also be placed inside the bubble cap to reduce thermal conductance between the bubble cap outer surface that is exposed to hot bed material and the inner surface of the bubble cap, being in contact with oxygen.

26 Claims, 4 Drawing Sheets

PRIMARY OXIDANT FEED TO OXY-FIRED CIRCULATING FLUIDIZED BED (CFB)

FIELD AND BACKGROUND OF THE INVENTION

1. Field of the Invention

The present invention relates generally to the field of circulating fluidized bed (CFB) reactors or boilers such as those used in industrial or electric power generation facilities and, in particular, to a primary oxidant feed designed to provide fluidization of bed material through the floor of the CFB.

2. Description of the Related Art

A combustion process where a mix of recycle gas and oxygen is utilized instead of air for firing fossil fuels (also known as oxy-combustion or oxy-firing) is gaining attention as a means for alleviating global warming by reducing the release of green house gases, particularly carbon dioxide ($CO_2$). Replacing the nitrogen contained in the air with the recycle gas results in a higher concentration of $CO_2$ in the flue gas that in turn reduces the cost of sequestering $CO_2$ for its storage underground or underwater.

In the field of oxy-combustion, a circulating fluidized bed (CFB) boiler presents certain advantages over a pulverized coal (PC) boiler. Since the bulk of the matter to be heated in a CFB is represented by the circulating bed material, its "normal" furnace temperature in the case of oxy-combustion can be accomplished with reduced gas recirculation (i.e., higher oxygen concentration in the oxidant streams) compared to PC units. This results in a reduced volume flow of the flue gas, which in turn results in savings on unit size and power consumption.

A typical air-fired CFB furnace utilizes two air streams: primary air and secondary air. Primary air, supplied through the furnace floor, provides fluidization of the bed material and supports combustion in the lower part of the furnace. Secondary air is typically supplied through rows of nozzles located opposite to each other at a certain elevation (in most cases between 10 and 20 feet) above the furnace floor. In the case of oxy-combustion, which typically implies using instead of air an oxidizing agent with increased oxygen concentration, typically comprised predominantly of oxygen and recycled flue gas, the terms "primary air" and "secondary air" should correspondingly be substituted with the terms "primary oxidant" and "secondary oxidant."

Along with its advantages, oxy-combustion in a CFB presents certain safety issues resulting from a combination of hot solids (potentially backsifting into the furnace windbox) and the high-oxygen stream fed through the windbox. Since starting up and shutting down an oxy-combustion CFB must be done in the conventional (i.e. air combustion) mode, transferring between air-combustion and oxy-combustion firing modes must be addressed.

SUMMARY OF THE INVENTION

The present invention minimizes safety issues resulting from a combination of hot solids and high-oxygen stream and addresses transferring between air-combustion and oxy-combustion firing modes for an oxy-fired CFB boiler.

Accordingly, one aspect of the present invention is drawn to a system for feeding a primary oxidant to an oxy-fired CFB boiler comprising: a plurality of bubble cap assemblies, each bubble cap assembly including a bubble cap, a stem, at least one exit hole, and an inner and outer surface; at least one windbox, wherein the at least one windbox has its own controlled oxidant feed and is connected to each of the stems of the plurality of bubble cap assemblies, and wherein the at least one windbox further comprises at least one manifold; a plurality of pipes, each pipe being located within one of the plurality of bubble cap assemblies, each pipe having an open end that is located at, or below, the at least one exit hole of each of the plurality of bubble cap assemblies and each pipe being connected at an opposite end to the at least one manifold contained within its respective windbox; a first controlled oxidant feed delivered independently to the at least one windbox, through the stem of each bubble cap assembly and through the at least one exit hole of each bubble cap assembly into the CFB and having a concentration of oxygen by volume not exceeding the limit specified in the current standard as set forth by the Compressed Gas Association, Inc.; and a second controlled oxidant feed delivered independently through the at least one manifold, to the plurality of pipes and into the plurality of bubble cap assemblies wherein it mixes with the first controlled oxidant feed and exits through the at least one exit hole of the bubble cap and having a concentration of oxygen by volume of at least the limit specified in the current standard as set forth by the Compressed Gas Association, Inc.

Another aspect of the present invention is drawn to a system for feeding a primary oxidant to an oxy-fired CFB boiler comprising: a plurality of bubble cap assemblies, each bubble cap assembly including a bubble cap, a stem, at least one exit hole, and an inner and outer surface; at least one windbox, wherein the at least one windbox has its own controlled oxidant feed and is connected to each of the stems of the plurality of bubble cap assemblies, and wherein the at least one windbox further comprises at least one manifold; a plurality of pipes, each pipe being located within one of the plurality of bubble cap assemblies, each pipe having an open end that is located at, or above, the at least one exit hole of each of the plurality of bubble cap assemblies and each pipe being connected at an opposite end to the at least one manifold contained within its respective windbox; a first controlled oxidant feed delivered independently to the at least one windbox, through the stem of each bubble cap assembly and through the at least one exit hole of each bubble cap assembly into the CFB and having a concentration of oxygen by volume not exceeding the limit specified in the current standard as set forth by the Compressed Gas Association, Inc.; and a second controlled oxidant feed delivered independently through the at least one manifold, to the plurality of pipes and into the plurality of bubble cap assemblies wherein it mixes with the first controlled oxidant feed and exits through the at least one exit hole of the bubble cap and having a concentration of oxygen by volume of at least the limit specified in the current standard as set forth by the Compressed Gas Association, Inc.

Yet another aspect of the present invention is drawn to a system for feeding a primary oxidant to an oxy-fired CFB boiler comprising: a plurality of bubble cap assemblies, each bubble cap assembly including a bubble cap, a stem, at least one exit hole, and an inner and outer surface; at least one windbox, wherein the at least one windbox has its own controlled oxidant feed and is connected to each of the stems of the plurality of bubble cap assemblies, and wherein the at least one windbox further comprises at least one manifold; a plurality of pipes, each pipe being located within one of the plurality of bubble cap assemblies, each pipe having an open end that is located at, or below, the at least one exit hole of each of the plurality of bubble cap assemblies and each pipe being connected at an opposite end to the at least one manifold contained within its respective windbox; an insulating gap designed to reduce thermal conductance between the inner and outer surfaces of each of the plurality of bubble caps, the insulating gap located within each of the bubble caps proper; a first controlled oxidant feed delivered independently to the at least one windbox, through the stem of each bubble cap assembly and through the at least one exit hole of each bubble cap assembly into the CFB and having a concentration of oxygen by volume not exceeding the limit specified in the current standard as set forth by the Compressed Gas Association, Inc.; and a second controlled oxidant feed delivered independently through the at least one manifold, to the plurality of pipes and into the plurality of bubble cap assemblies wherein it mixes with the first controlled oxidant feed and exits through the at least one exit hole of the bubble cap and having a concentration of oxygen by volume of at least the limit specified in the current standard as set forth by the Compressed Gas Association, Inc.

Yet still another aspect of the present invention is drawn to a system for feeding a primary oxidant to an oxy-fired CFB boiler comprising: a plurality of bubble cap assemblies, each bubble cap assembly including a bubble cap, a stem, at least one exit hole, and an inner and outer surface; at least one windbox, wherein the at least one windbox has its own controlled oxidant feed and is connected to each of the stems of the plurality of bubble cap assemblies, and wherein the at least one windbox further comprises at least one manifold; a plurality of pipes, each pipe being located within one of the plurality of bubble cap assemblies, each pipe having an open end that is located at, or above, the at least one exit hole of each of the plurality of bubble cap assemblies and each pipe being connected at an opposite end to the at least one manifold contained within its respective windbox; an insulating gap designed to reduce thermal conductance between the inner and outer surfaces of each of the plurality of bubble caps, the insulating gap located within each of the bubble caps proper; a first controlled oxidant feed delivered independently to the at least one windbox, through the stem of each bubble cap assembly and through the at least one exit hole of each bubble cap assembly into the CFB and having a concentration of oxygen by volume not exceeding the limit specified in the current standard as set forth by the Compressed Gas Association, Inc.; and a second controlled oxidant feed delivered independently through the at least one manifold, to the plurality of pipes and into the plurality of bubble cap assemblies wherein it mixes with the first controlled oxidant feed and exits through the at least one exit hole of the bubble cap and having a concentration of oxygen by volume of at least the limit specified in the current standard as set forth by the Compressed Gas Association, Inc.

A still further aspect of the present invention is drawn to a method of operating a system for feeding a primary oxidant to an oxy-fired circulating fluidized bed (CFB) boiler, the method comprising the steps of: providing a plurality of bubble cap assemblies, each bubble cap assembly including a bubble cap, a stem, at least one exit hole, and an inner and outer surface; providing at least one windbox, wherein the at least one windbox has its own controlled oxidant feed and is connected to each of the stems of the plurality of bubble cap assemblies, and wherein the at least one windbox further comprises at least one manifold; providing a plurality of pipes, each pipe being located within one of the plurality of bubble cap assemblies, each pipe having an open end that is located at, above, or below, the at least one exit hole of each of the plurality of bubble cap assemblies and each pipe being connected at an opposite end to the at least one manifold contained within its respective windbox; providing a first controlled oxidant feed delivered independently to the at least one windbox, through the stem of each bubble cap assembly and through the at least one exit hole of each bubble cap assembly into the CFB and having a concentration of oxygen by volume not exceeding the limit specified in the current standard as set forth by the Compressed Gas Association, Inc.; and providing a second controlled oxidant feed delivered independently through the at least one manifold, to the plurality of pipes and into the plurality of bubble cap assemblies wherein it mixes with the first controlled oxidant feed and exits through the at least one exit hole of the bubble cap and having a concentration of oxygen by volume of at least the limit specified in the current standard as set forth by the Compressed Gas Association, Inc., wherein during start-up, shut-down and low-load operation of the CFB boiler, only the first controlled oxidant feed is supplied and the second controlled oxidant feed is not supplied, and wherein during high-load operation both the first and second controlled oxidant feeds are supplied.

The various features of novelty which characterize the invention are pointed out with particularity in the claims annexed to and forming a part of this disclosure. For a better understanding of the invention, its operating advantages and specific benefits attained by its uses, reference is made to the accompanying drawings and descriptive matter in which exemplary embodiments of the invention are illustrated.

DESCRIPTION OF THE INVENTION

The present invention relates generally to the field of circulating fluidized bed (CFB) reactors or boilers such as those used in electric power generation facilities and, in particular, to a primary oxidant feed to an oxy-fired CFB.

As used herein, the term CFB boiler will be used to refer to CFB reactors or combustors wherein a combustion process takes place. While the present invention is directed particularly to boilers or steam generators which employ CFB combustors as the means by which the heat is produced, it is understood that the present invention can readily be employed in a different kind of CFB reactor. For example, the invention could be applied in a reactor that is employed for chemical reactions other than a combustion process, or where a gas/solids mixture from a combustion process occurring elsewhere is provided to the reactor for further processing.

Figure 1:
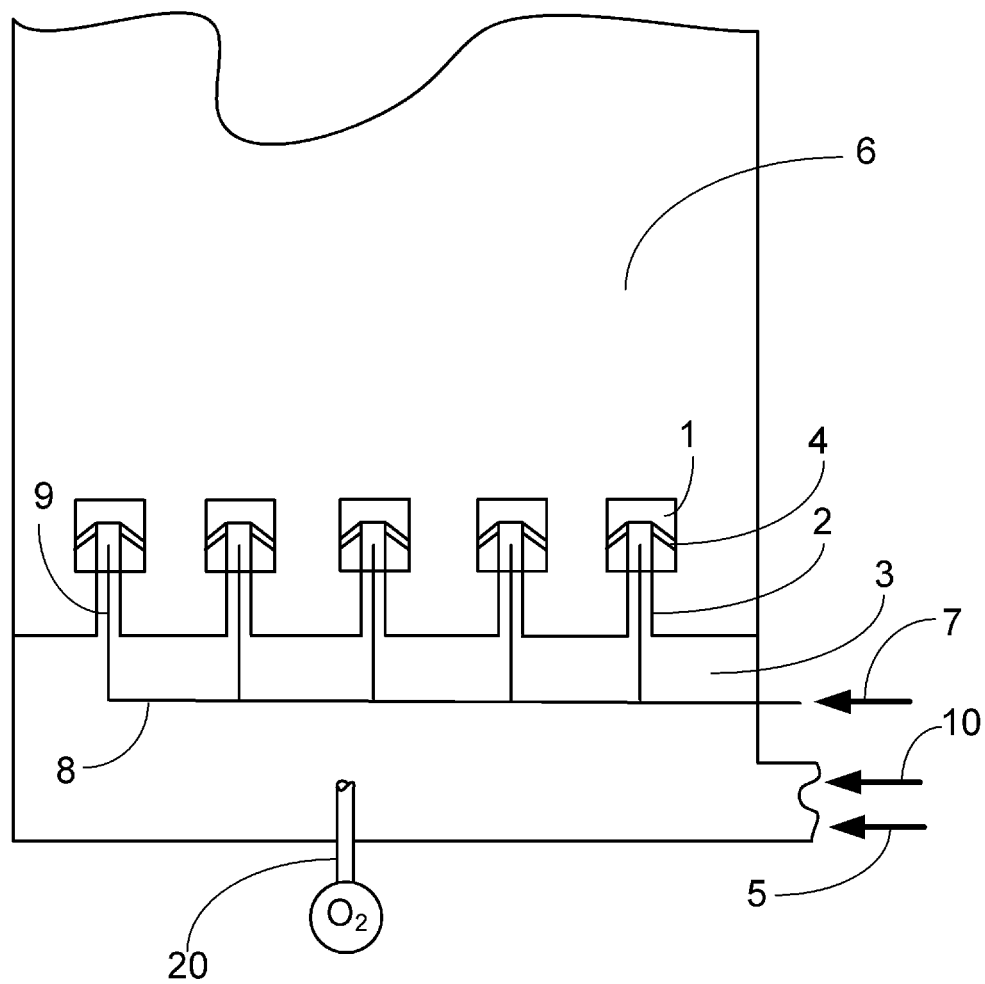
FIG. 1 is a sectional side elevational view of a lower portion of a CFB boiler according to the invention illustrating the primary oxidants.

Referring now to the drawings, wherein like reference numerals designate the same or functionally similar elements throughout the several drawings and to FIG. 1 in particular, a cross-sectional view of a lower portion of a CFB boiler is shown comprising an array of bubble caps 1 connected via stems 2 (together comprising and referred to herein as a bubble cap assembly) to a windbox 3. Each bubble cap 1 has at least one exit hole 4. In the oxy-combustion mode of operation, recycle gas 5 is supplied in a controlled manner to the windbox 3 and further through the stems 2 and bubble caps 1 into CFB 6. Oxygen 7 is supplied in a controlled manner through a manifold 8 and further through pipes 9 located inside each stem 2 associated with a corresponding bubble cap 1. Several parallel manifolds 8 can be located in a given windbox 3, each manifold feeding a number of pipes 9. Oxygen exits the pipe 9 provided within the bubble cap assembly, mixes there with the recycle gas 5 and exits into the CFB 6.

Certain oxygen concentrations should be observed in the practice of the present invention. In particular, it is desirable to provide oxygen 7 to the windbox 3 having a concentration of oxygen by volume not exceeding the limit specified in the current standard as set forth by the Compressed Gas Association, Inc. Also, it is desirable to provide oxygen 7 to the manifold 8 having a concentration of oxygen by volume of at least the limit specified in the current standard as set forth by the Compressed Gas Association, Inc. (CGA). The current standard is a concentration of oxygen by volume of 28 percent, per CGA G-4.4-2003 (EIGA Doc. 13/02) Oxygen Pipeline Systems, Fourth Edition.

In the air-combustion mode of operation, air 10 is supplied in a controlled manner to the windbox 3 and follows the same route as the recycle gas 5 during the oxy-combustion mode of operation. The recycle gas 5 in some cases can still be supplied to the windbox 3 in limited amounts during the air-combustion mode of operation. However, typically only air 10 will be fed during the air-combustion mode of operation; oxygen 7 will not be fed through the manifold 8 during the air-combustion mode of operation.

The windbox 3 can be made as a single chamber extending under the entire CFB 6. It can also occupy only a part of the plan area of the CFB 6. In this case, several windboxes 3, each with its own controlled feed of recycle gas and/or air, will be employed. Correspondingly, in this case each windbox 3 is equipped with its own manifolds 8 for supplying oxygen 7 to the pipes 9.

The floor of the CFB furnace can be made of a gas-tight membrane, which would typically be a water-cooled membrane panel separating the furnace containing the CFB 6 from the windbox 3. It could also be a surface of the stagnant bed material below the exit holes of the bubble caps, the material being held by hoppers (not shown) located beneath the furnace. In such a case, the windbox 3 (or windboxes 3) would be a large diameter (typically from 18 to 36 inches) pipe (not shown) or a number of parallel large diameter pipes (also not shown) supplying recycle gas 5 or air 10 or a mix thereof to the bubble caps 1. The pipes will be located within the stagnant bed material inside the hoppers. Each pipe will be equipped with at least one manifold 8 for supplying oxygen 7 to the pipes 9. The flow of recycle gas/air to the pipes can be controlled separately for each pipe or as a total flow to all parallel pipes provided that uniform distribution between the pipes is achieved. The same options exist for controlling the flow of oxygen to manifolds 8, i.e., separately for each manifold or as a total flow.

Each windbox 3, whether made as a chamber separated from the furnace by a gas-tight membrane or as a pipe immersed into a bed material in a hopper, is equipped with an oxygen measurement probe 20.

Figure 2:
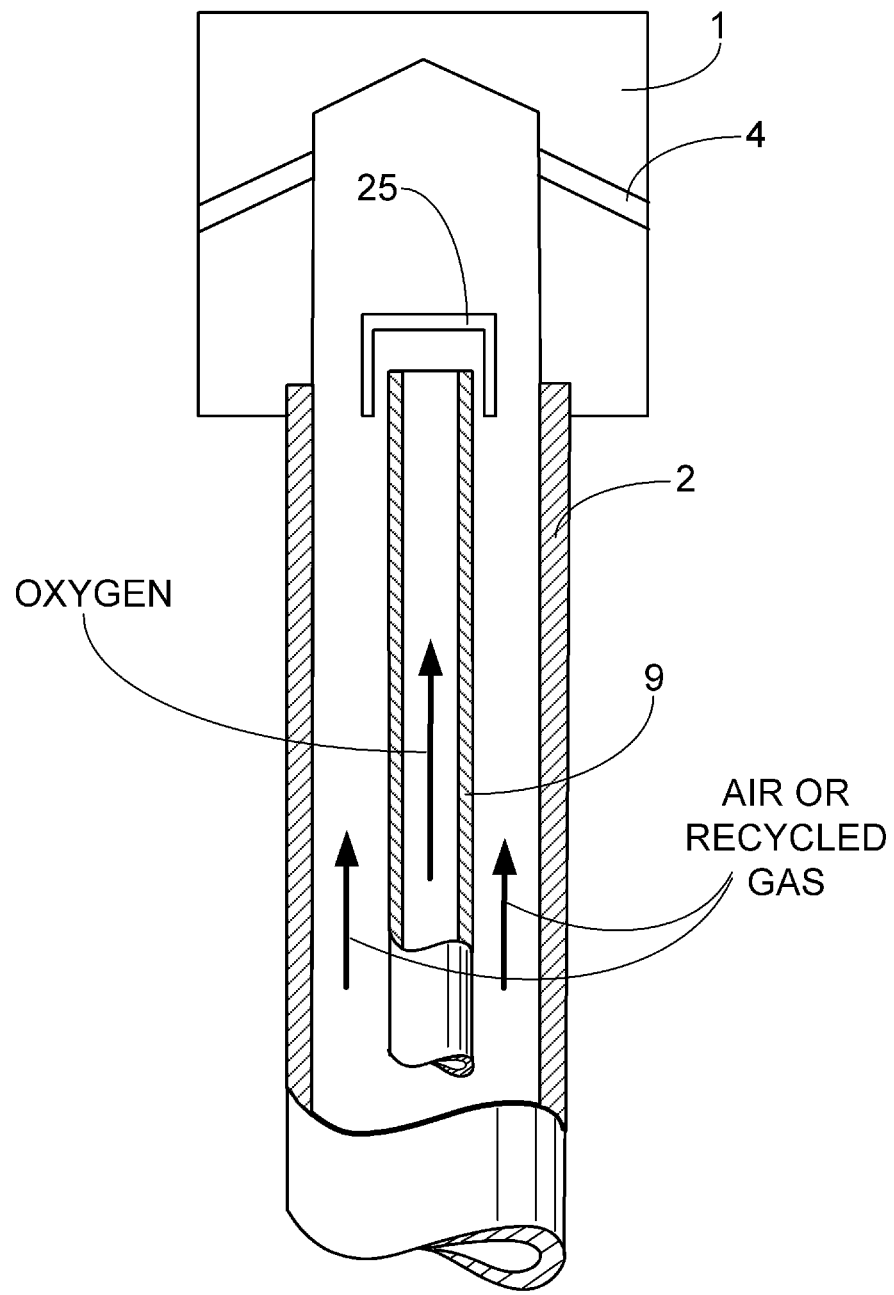
FIG. 2 is a cross-sectional view of a bubble cap according to a first embodiment of the invention.
Figure 3:
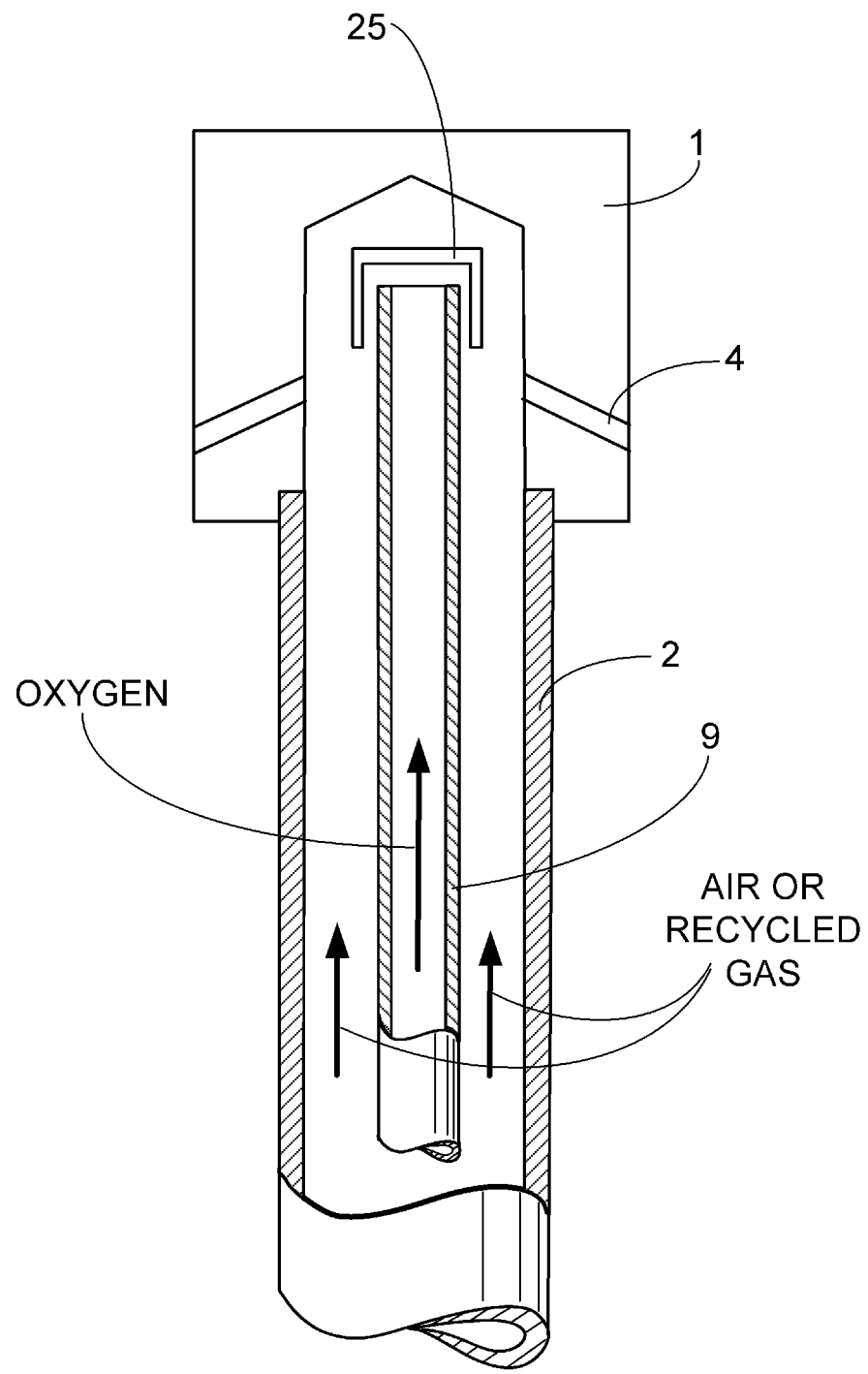
FIG. 3 is a cross-sectional view of a bubble cap according to a second embodiment of the invention.
Figure 4:
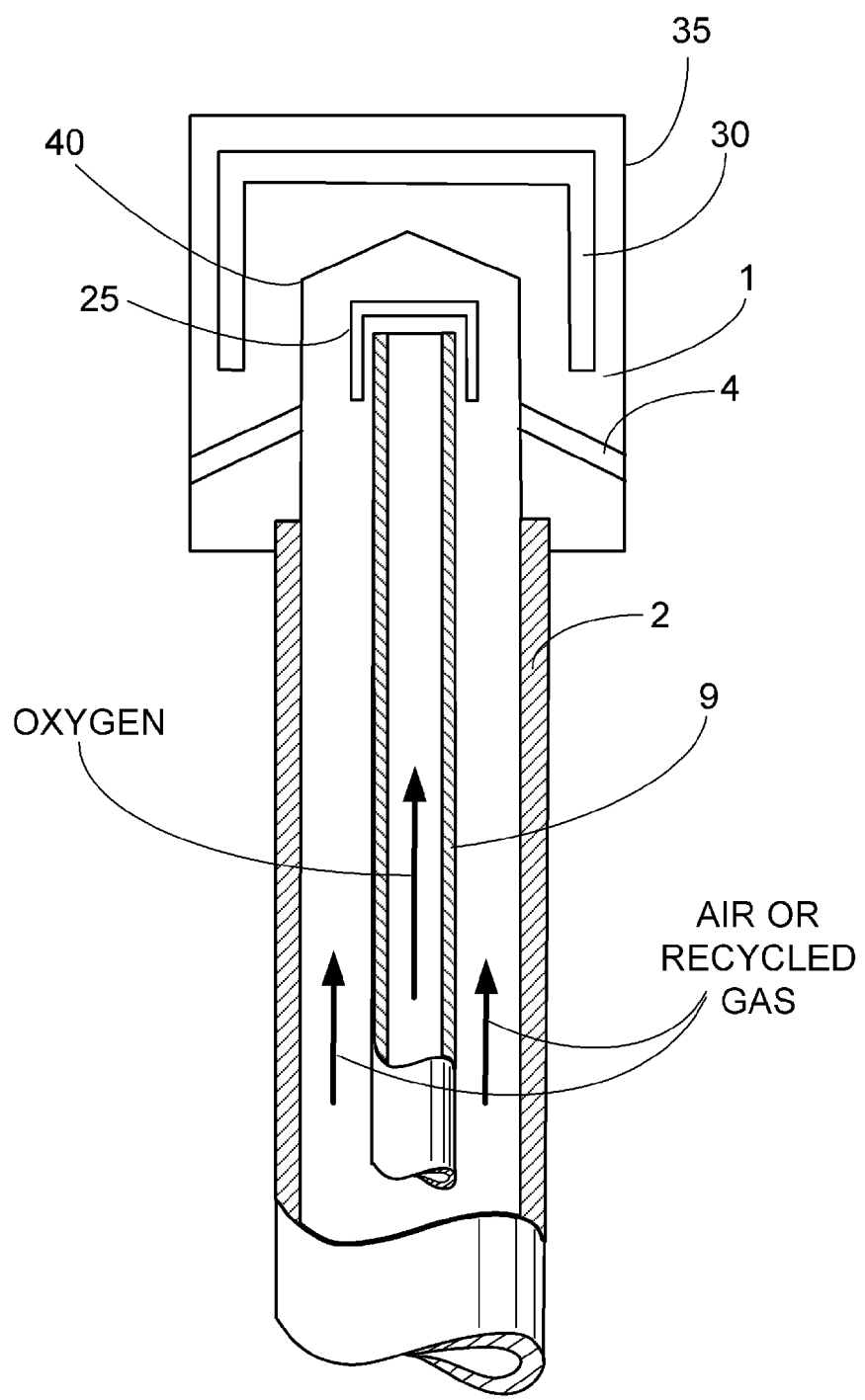
FIG. 4 is a cross-sectional view of a bubble cap according to a third embodiment of the invention.

Separate embodiments for a bubble cap and stem assembly are shown in FIGS. 2 through 4, where the numbers designating specific parts correspond to the numbers for the same parts in FIG. 1.

The end of the pipe 9 may be located anywhere within the bubble cap assembly, i.e., within the stem 2 or the bubble cap 1, above, at or below the exit holes 4. The downward direction of the exit opening for oxygen 7 into the bubble cap assembly reduces the possibility of accidental introduction of hot particles into the pipe 9. As used herein, the term downward is defined to mean having an angle of deflection of at least about 5 degrees from horizontal, or at least about 10 degrees, or at least about 15 degrees, or even at least about 20 degrees. If particles of bed material enter the bubble cap assembly through the exit holes 4, which may happen due to pulsations in the CFB 6, they will tend to fall down along the stem 2. The downward direction of the exit opening for oxygen 7 can be accomplished by a variety of means including, but not limited to, providing a debris shield 25 attached via any suitable means (e.g., welded, screwed, pressed-fitted, etc.) to the top of the pipe 9, to the top of the stem 2 or by bending the pipe downward (not shown). The debris shield 25 may advantageously comprise metal fins in a louvered arrangement. Other options known to those skilled in the art can also be utilized for preventing hot particles from entering the pipe 9.

In order to reduce the potential for a chemical reaction (corrosion or even burning) between the oxygen and the material of the bubble cap 1, the latter can feature an insulating gap 30. The insulating gap 30 is located within the bubble cap 1 proper. The insulating gap 30 will reduce thermal conductance between the bubble cap's 1's outer surface 35 that is exposed to the hot bed material and its inner surface 40 in which is in contact with oxygen 7. The resulting reduction of the inner surface temperature of the bubble cap 1 will assist in preventing a chemical reaction between the bubble cap 1 material and the oxygen 7. Utilizing high grade stainless steel or non-metallic materials for the bubble cap 1 and/or stem 2 (whether the entire body or inner lining) can also be used. Materials with a low tendency to have a chemical reaction with oxygen (stainless steel, ceramics, etc.) can also be utilized for construction or lining of the windbox and oxygen manifold piping 8.

During the boiler start up and low load operation, only air 10 is fed to the bed through the windbox 3 followed by the stems 2 and bubble caps 1. At about 40 percent of full load, oxygen feed starts through the manifold 8 and pipes 9 along with recycle gas 5 replacing air 10. Oxygen 7 exits the pipes 9, mixes with recycle gas 5 within the bubble cap assemblies of bubble caps 1 and stems 2, and the mix enters the CFB 6 through the exit holes 4. For the boiler load reduction and shut-down, the sequence is reversed.

Changing oxygen volume concentration in the medium flowing through the holes 4 from about 21 percent during air-combustion mode of operation during low-load operation to about 50-60 percent during oxy-combustion mode of operation at high-load operation allows maintaining the fluidizing medium flow rate in a relatively narrow range. This in turn allows maintaining a velocity in the exit holes 4 close to the optimum value at all loads. The optimum velocity is one which does not result in high pressure drop across the exit holes 4, thereby reducing power consumption, and one which avoids an excessively low velocity, thereby substantially reducing the potential for backsifting of hot material into the bubble cap assemblies and improving safety and reliability.

If exit holes 4 in a bubble cap 1 become plugged with bed material and oxygen 7 flows to the windbox 3, the increase of oxygen concentration there will be sensed by the probe 20 and a corresponding action will be taken (alarm, oxygen flow reduction, etc.). If oxygen concentration in the windbox 3 exceeds a preset level, its flow to a corresponding manifold 8 is shut off.

While specific embodiments of the present invention have been shown and described in detail to illustrate the application and principles of the invention, it will be understood that it is not intended that the present invention be limited thereto and that the invention may be embodied otherwise without departing from such principles. In some embodiments of the invention, certain features of the invention may sometimes be used to advantage without a corresponding use of the other features. Accordingly, all such changes and embodiments properly fall within the scope of the following claims.

What is claimed is:

1. A system for feeding a primary oxidant to an oxy-fired circulating fluidized bed (CFB) boiler comprising:
   a plurality of bubble cap assemblies, each bubble cap assembly including a bubble cap, a stem, one or more exit holes, and an inner and outer surface;
   at least one windbox, wherein the at least one windbox has its own controlled oxidant feed and is connected to each of the stems of the plurality of bubble cap assemblies, and wherein the at least one windbox further comprises at least one manifold;
   a plurality of pipes, each pipe being located within one of the plurality of bubble cap assemblies, each pipe having an open end that is located at, or below, each of the one or more exit holes of each of the plurality of bubble cap assemblies and each pipe being connected at an opposite end to the at least one manifold contained within its respective windbox;
   a first controlled oxidant feed delivered independently to the at least one windbox, through the stem of each bubble cap assembly and through the one or more exit holes of each bubble cap assembly into the CFB and having a concentration of oxygen by volume not exceeding 28% oxygen by volume; and
   a second controlled oxidant feed delivered independently through the at least one manifold, to the plurality of pipes and into the plurality of bubble cap assemblies wherein it mixes with the first controlled oxidant feed and exits through the one or more exit holes of the bubble cap and having a concentration of oxygen by volume of at least 28%;
   wherein the direction of the exit of the second controlled oxidant feed from the open end of each of the plurality of pipes in each of the plurality of bubble cap assemblies is oriented in a downward direction.

2. The system according to claim 1, wherein each windbox is equipped with an oxygen measurement probe.

3. The system according to claim 1, wherein at least an inner surface of the plurality of the bubble caps and stems are coated with, or made from, stainless steel.

4. The system according to claim 1, wherein at least an inner surface of the plurality of the bubble caps and stems are coated with, or made from, one or more non-metallic materials.

5. The system according to claim 1, wherein the at least one windbox and the plurality of pipes are made from, or lined with, stainless steel.

6. The system according to claim 1, wherein the at least one windbox and the plurality of pipes are made from, or lined with, one or more non-metallic materials.

7. The system according to claim 1, wherein the direction of the exit from the open end of each of the plurality of pipes is oriented downwards by a debris shield attached to the open end of the pipe.

8. A system for feeding a primary oxidant to an oxy-fired circulating fluidized bed (CFB) boiler comprising:
   a plurality of bubble cap assemblies, each bubble cap assembly including a bubble cap, a stem, one or more exit holes, and an inner and outer surface;
   at least one windbox, wherein the at least one windbox has its own controlled oxidant feed and is connected to each of the stems of the plurality of bubble cap assemblies, and wherein the at least one windbox further comprises at least one manifold;
   a plurality of pipes, each pipe being located within one of the plurality of bubble cap assemblies, each pipe having an open end that is located at, or above, each of the one or more exit holes of each of the plurality of bubble cap assemblies and each pipe being connected at an opposite end to the at least one manifold contained within its respective windbox;
   a first controlled oxidant feed delivered independently to the at least one windbox, through the stem of each bubble cap assembly and through the one or more exit holes of each bubble cap assembly into the CFB and having a concentration of oxygen by volume not exceeding 28% oxygen by volume; and
   a second controlled oxidant feed delivered independently through the at least one manifold, to the plurality of pipes and into the plurality of bubble cap assemblies wherein it mixes with the first controlled oxidant feed and exits through the one or more exit holes of the bubble cap and having a concentration of oxygen by volume of at least 28%;
   wherein the direction of the exit of the second controlled oxidant feed from the open end of each of the plurality of pipes in each of the plurality of bubble cap assemblies is oriented in a downward direction.

9. The system according to claim 8, wherein each windbox is equipped with an oxygen measurement probe.

10. The system according to claim 8, wherein at least an inner surface of the plurality of the bubble caps and stems are coated with, or made from, stainless steel.

11. The system according to claim 8, wherein at least an inner surface of the plurality of the bubble caps and stems are coated with, or made from, one or more non-metallic materials.

12. The system according to claim 8, wherein the at least one windbox and the plurality of pipes are made from, or lined with, stainless steel.

13. The system according to claim 8, wherein the at least one windbox and the plurality of pipes are made from, or lined with, one or more non-metallic materials.

14. The system according to claim 8, wherein the direction of the exit from the open end of each of the plurality of pipes is oriented downwards by a debris shield attached to the open end of the pipe.

15. A system for feeding a primary oxidant to an oxy-fired circulating fluidized bed (CFB) boiler comprising:
   a plurality of bubble cap assemblies, each bubble cap assembly including a bubble cap, a stem, one or more exit holes, an inner surface and an outer surface, and an insulating gap designed to reduce thermal conductance between the inner surface and the outer surface;
   at least one windbox, wherein the at least one windbox has its own controlled oxidant feed and is connected to each of the stems of the plurality of bubble cap assemblies, and wherein the at least one windbox further comprises at least one manifold;
   a plurality of pipes, each pipe being located within one of the plurality of bubble cap assemblies, each pipe having an open end that is located at, or below, each of the one or more exit holes of each of the plurality of bubble cap assemblies and each pipe being connected at an opposite end to the at least one manifold contained within its respective windbox;
   a first controlled oxidant feed delivered independently to the at least one windbox, through the stem of each bubble cap assembly and through the one or more exit holes of each bubble cap assembly into the CFB and having a concentration of oxygen by volume not exceeding 28%; and a second controlled oxidant feed delivered independently through the at least one manifold, to the plurality of pipes and into the plurality of bubble cap assemblies wherein it mixes with the first controlled oxidant feed and exits through the one or more exit holes of the bubble cap and having a concentration of oxygen by volume of at least 28%;

wherein the direction of the exit of the second controlled oxidant feed from the open end of each of the plurality of pipes in each of the plurality of bubble cap assemblies is oriented in a downward direction.

16. The system according to claim 15, wherein each windbox is equipped with an oxygen measurement probe.

17. The system according to claim 15, wherein at least an inner surface of the plurality of the bubble caps and stems are coated with, or made from, stainless steel.

18. The system according to claim 15, wherein at least an inner surface of the plurality of the bubble caps and stems are coated with, or made from, one or more non-metallic materials.

19. The system according to claim 15, wherein the at least one windbox and the plurality of pipes are made from, or lined with, stainless steel.

20. The system according to claim 15, wherein the at least one windbox and the plurality of pipes are made from, or lined with, one or more non-metallic materials.

21. A system for feeding a primary oxidant to an oxy-fired circulating fluidized bed (CFB) boiler comprising:

a plurality of bubble cap assemblies, each bubble cap assembly including a bubble cap, a stem, one or more exit holes, and an inner and outer surface;

at least one windbox, wherein the at least one windbox has its own controlled oxidant feed and is connected to each of the stems of the plurality of bubble cap assemblies, and wherein the at least one windbox further comprises at least one manifold;

a plurality of pipes, each pipe being located within one of the plurality of bubble cap assemblies, each pipe having an open end that is located at, or above, each of the one or more exit holes of each of the plurality of bubble cap assemblies and each pipe being connected at an opposite end to the at least one manifold contained within its respective windbox;

an insulating gap designed to reduce thermal conductance between the inner and outer surfaces of each of the plurality of bubble caps, the insulating gap located within each of the bubble caps proper;

a first controlled oxidant feed delivered independently to the at least one windbox, through the stem of each bubble cap assembly and through the one or more exit holes of each bubble cap assembly into the CFB and having a concentration of oxygen by volume not exceeding 28% oxygen by volume; and a second controlled oxidant feed delivered independently through the at least one manifold, to the plurality of pipes and into the plurality of bubble cap assemblies wherein it mixes with the first controlled oxidant feed and exits through the one or more exit holes of the bubble cap and having a concentration of oxygen by volume of at least 28%;

wherein the direction of the exit of the second controlled oxidant feed from the open end of each of the plurality of pipes in each of the plurality of bubble cap assemblies is oriented in a downward direction.

22. The system according to claim 21, wherein each windbox is equipped with an oxygen measurement probe.

23. The system according to claim 21, wherein at least an inner surface of the plurality of the bubble caps and stems are coated with, or made from, stainless steel.

24. The system according to claim 21, wherein at least an inner surface of the plurality of the bubble caps and stems are coated with, or made from, one or more non-metallic materials.

25. The system according to claim 21, wherein the at least one windbox and the plurality of pipes are made from, or lined with, stainless steel.

26. The system according to claim 21, wherein the at least one windbox and the plurality of pipes are made from, or lined with, one or more non-metallic materials.

* * * * *